United States Patent
Albou et al.

(10) Patent No.: US 11,025,873 B2
(45) Date of Patent: Jun. 1, 2021

(54) METHOD AND SYSTEM FOR SELECTIVELY ADJUSTING PIXELS, IN AN OPTICAL MODULE, IN ORDER TO AMEND GEOMETRIC DEFECTS DUE TO MANUFACTURING TOLERANCES

(71) Applicant: VALEO VISION, Bobigny (FR)

(72) Inventors: Pierre Albou, Bobigny (FR); Vincent Godbillon, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 16/158,531

(22) Filed: Oct. 12, 2018

(65) Prior Publication Data
US 2019/0116345 A1    Apr. 18, 2019

(30) Foreign Application Priority Data
Oct. 13, 2017   (FR) ...................................... 1759633

(51) Int. Cl.
*H04N 9/31*       (2006.01)
*F21S 41/25*      (2018.01)
(Continued)

(52) U.S. Cl.
CPC .......... *H04N 9/3185* (2013.01); *B60Q 1/076* (2013.01); *F21S 41/25* (2018.01); *F21S 41/675* (2018.01); *G01C 21/365* (2013.01)

(58) Field of Classification Search
CPC ...... H04N 9/3185; F21S 41/675; F21S 41/25; B60Q 1/076; G01C 21/365; G03B 21/142; G03B 21/147; G03B 21/005
See application file for complete search history.

(56) References Cited

U.S. PATENT DOCUMENTS

| | | | |
|---|---|---|---|
| 2004/0135977 A1* | 7/2004 | Ito | G03B 21/006 353/122 |
| 2004/0218401 A1* | 11/2004 | Okubo | B60Q 1/10 362/526 |

(Continued)

FOREIGN PATENT DOCUMENTS

DE    10 2016 103 649 A1    9/2017

OTHER PUBLICATIONS

French Preliminary Search Report dated Jul. 10, 2018 in French Application 17 59633, filed on Oct. 13, 2017 (with English Translation of Categories of Cited Documents).

(Continued)

*Primary Examiner* — Michelle M Iacoletti
*Assistant Examiner* — Magda Cruz
(74) *Attorney, Agent, or Firm* — Oblon, McClelland, Maier & Neustadt, L.L.P.

(57) ABSTRACT

A luminous motor-vehicle system including an optical module and aims to compensate for undesirable movement or deformation effects caused by the manufacturing tolerances of the optical portion. The module includes an imaging device provided with a pixelated spatial modulator, which is illuminated by a source, and a projecting optic. A control unit for controlling the modulator receives first display commands that are representative of an image to be projected. This unit converts each first display command into a second display command taking into account correction parameters, which are predefined on the basis of an identification of geometric defects specific to the projecting optic. The control unit controls the modulator, which may be a digital micromirror device, depending on the second display commands in order that the image actually projected by the imaging device corresponds to the image to be projected.

19 Claims, 5 Drawing Sheets

(51) Int. Cl.
G01C 21/36 (2006.01)
F21S 41/675 (2018.01)
B60Q 1/076 (2006.01)

(56) References Cited

U.S. PATENT DOCUMENTS

| | | | |
|---|---|---|---|
| 2010/0292886 A1* | 11/2010 | Szczerba | G01S 13/723 |
| | | | 701/31.4 |
| 2013/0069961 A1* | 3/2013 | Ota | H04N 9/3179 |
| | | | 345/506 |
| 2013/0222776 A1* | 8/2013 | Ishikawa | H04N 9/3185 |
| | | | 353/121 |
| 2014/0146290 A1 | 5/2014 | Sieler et al. | |
| 2016/0073000 A1* | 3/2016 | Abele | H04N 5/2256 |
| | | | 348/148 |

OTHER PUBLICATIONS

Chinese Office Action dated Sep. 9, 2020 in corresponding application No. 201811199584.4, filed Oct. 15, 2018 (with English translation, 15 pages).

* cited by examiner

METHOD AND SYSTEM FOR SELECTIVELY ADJUSTING PIXELS, IN AN OPTICAL MODULE, IN ORDER TO AMEND GEOMETRIC DEFECTS DUE TO MANUFACTURING TOLERANCES

The present invention relates to vehicle lighting employing a modulator that is spatially decomposed into pixels, for example taking the form of a digital micromirror device (DMD) the micromirrors of which are controllable. The invention more particularly relates, in the automotive field, to a method and system allowing pixels of the image to be projected to be adjusted in order to amend, in the projected image, geometric defects inherent to the design or assembly of the forming optic.

A motor-vehicle lighting and/or signalling device comprising a light source and a digital micromirror device or similar modulating device allowing a light beam to be decomposed into pixels that are distributed in two dimensions is known. The digital micromirror device is generally used to reflect light rays originating from the light source toward an optic for forming the light beam, which optic is intended to project the image formed on the digital micromirror device, to form of an output light beam. This light beam for example allows the route that the motor vehicle comprising this lighting and/or signalling device is being driven along to be illuminated, or performs a signalling function.

Such lighting devices are designed using mass production methods. There is necessarily a play between the constituent elements of the lighting and/or signalling device, on the one hand in order to allow easy assembly, and on the other hand because the parts are generally not machined but rather moulded from plastic, this allowing production costs to be decreased.

It must in particular be underlined how difficult it is to perfectly align a modulator that is spatially decomposed into pixels (also called a high-definition pixelated spatial modulator, on account of the very large number of pixels that can be activated or deactivated) and the projecting optical portion, which generally takes the form of a least one lens. Because of the high numerical aperture of the objective used for the projection function, the projection quality of the image decreases significantly if the lateral offset from the optical axis reaches 50 µm. Furthermore, it is in practice complicated to dynamically align the position of the elements (of which the digital micromirror device or similar modulating device forms part) during the manufacture of an optical module.

The manufacturing and positioning tolerances of the elements that compose the optical system may then lead to geometric defects, perceptible on the internal projection screen of the lighting and/or signalling device if the latter has one, or indeed on a screen placed outside the device when the lighting and/or signalling device is designed to project a beam directly onto the road and does not possess an internal projection screen.

Moreover, the projecting lens most of the time generates other aberrations that make the images hazy. This effect is accentuated by the aforementioned positional offset.

These geometric defects are accentuated when a high numerical aperture is necessary, for example with a coefficient close to or of about 0.7 (large-angle optic). There is therefore a need to provide better optical systems, in particular for a high numerical aperture, without making use of complex and expensive parts nor requiring tedious and expensive adjustment operations to be carried out to align the elements with one another.

The invention therefore aims to prevent manufacturing tolerances, which come into play at the moment of production, from resulting in geometric defects (significant deformations or excessive movement with respect to the optical axis) of the formed light beam such as projected onto the projection screen before exiting from the vehicle or such as projected directly onto the road.

To this end, the invention relates to a method for amending geometric defects in a light beam projected by a motor-vehicle optical module, the optical module including:
 an imaging device, provided with a high-definition pixelated spatial modulator and a projecting optic,
 a light source for generating light intended for the modulator,
 and optionally, a projection screen suitable for receiving a light beam transmitted by the projecting optic,
the method comprising steps essentially consisting in:
 receiving a first command to display an image to be projected, intended for the high-definition pixelated spatial modulator; and
 converting the first display command into a second display command that takes into account correction parameters,
the correction parameters being predefined on the basis of an identification of geometric defects that are specific to the projecting optic, by virtue of which the modulator is controlled so that the image actually projected using the imaging device corresponds better to the image to be projected than without said correction parameters taken into account.

By virtue of these arrangements, the lighting can be controlled and adapted by generating a defect-compensating effect that relocates certain portions of the beam and/or that deforms the aspect of this beam. This method allows, via a selective activation or deactivation of pixels of the modulator and optionally a modulation of the duration of activation of these pixels, the beam to be adapted without recourse to any mechanical device or additional part that would have an impact with respect to bulk.

It will be understood that the geometric defects that are specific to the projecting optic correspond to all the defects that exist downstream, in the direction of propagation of the light in the optical module, of the high-definition pixelated spatial modulator. It is in particular a question of slight defaults in the alignment of one or more constituent elements of the projecting optic (defects related to tolerances, in particular lateral tolerances) and inherent structural defects related to the complex shape of the projecting lens.

The method allows an effective method to be used to mass-produce the optical modules, while leaving a degree of tolerance that facilitates the assembly operations and minimizes manufacturing constraints and the cost of the optical elements (a perfect lens being expensive for example, particularly if it is a question of a lens with a high numerical aperture).

A better correspondence to the desired image of course results from the decrease in shifts or anomalies affecting the perception of the projected image. Typically, the geometric shifts or indeed variations in line thickness that are measured in sections of the image are decreased.

Another advantage of the method is that the identification of geometric defects is carried out only once, and therefore further comparison steps are not required during operation.

According to one option, the second display command in particular differs from the first display command in the selective activation of all or some of a row of pixels, said row being defined in a marginal zone (on the border or on the side of a border) by the modulator.

According to one particularity, the correction parameters are suitable for modifying activation statuses of the pixels in order to compensate for at least one among the following defects:
- a lateral shift of the outline of the light beam transmitted by the projecting optic; and
- a deformation of the outline of the light beam transmitted by the projecting optic.

According to one particularity, the correction parameters compensate for distortion effects by determining, in the modulator, positional shifts to be selectively applied to pixel zones identified beforehand in a calibration phase allowing geometric defects to be identified. In practice, these are typically stretching or contracting effects that end up, because of the discrete character of the modulator, resulting in shifts, but also variations in brightness, i.e. variations in greyscale levels if the analogy of a digital image is taken. It will be noted that the expression greyscale levels applies to the brightness variation independently of the actual colour of the light beam. Thus it corresponds to an indication of the brightness of the beam, whether the latter is white or a colour, for example red or amber or any other colour.

According to one particularity, the correction parameters and/or second display command are stored in a memory that is accessible to a control unit. Typically, this control unit allows the second display command to be activated.

It will be understood that the memory to which the control unit has access may allow data representative of the calibration, in particular the correction parameters, and/or one or more predefined images that correspond to the result of the correction, to be stored.

According to one particularity, the correction parameters are obtained after:
- obtaining, using at least one test pattern, a set series of pieces of shift information relating to differences in position and shape affecting the test pattern such as projected (projection onto a projection screen inside the module, which screen is suitable for receiving a light beam transmitted by the projecting optic, or projection directly to the exterior),
- calculation of correction parameters to be applied to the light beam transmitted from the modulator depending on the set series of pieces of shift information,
- activating or deactivating one or more pixels of the modulator depending on the correction parameters; this typically relies on a stock of pixels that are not used when the system is correctly adjusted, these pixels being used for the corrections when the latter require the image that will be projected to be moved (shifts, tolerances) and/or enlarged (distortion).

According to one particularity, to compensate for distortion (related to the design of the optic or to lateral play), the pixels of the modulator are divided into zones and the shift to be applied to obtain the right projected shape is calculated for each zone. This zonal division may allow at least four zones (optionally of equal area), and preferably at least nine zones for example, to be defined.

According to one particularity, a command to display a test pattern is stored in a memory that is accessible to the control unit, the test pattern being displayed in a prior step of identifying and defining correction parameters.

According to one particularity, in the modulator, the test pattern preferably extends over a central sector and at least over four additional sectors that are of equal size and formed around the central sector. It will be understood that part of the test pattern lies at distance from a central zone of the pixels of the modulator, this allowing certain defects to which correction parameters correspond to be identified.

According to one particularity, to compensate for haze, a test pattern defining desired features is used, and the decrease in the number of "activated" pixels to be applied to the modulator to project a test pattern that has the same feature boundaries as the desired features, and the ratio of "activated/inactivated" pixels to be applied to compensate for the flux decrease associated with the decrease in the number of pixels used, are calculated. More generally, certain lines will be thinned so that once projected they have the desired thickness. This may improve certain outlines, in particular those parallel to the lines of the test pattern.

A method according to the invention may comprise one or more of the following features:
- the modulator has a single electrical power-supply input and allows a number of pixels higher than or equal to 1000 to be selectively activated.
- activation is optionally achieved via control of a movement of a movable element provided in each micromirror of a digital micromirror device (each movable micromirror having at least two positions, one of which is an activated position and the other of which is a deactivated position with respect to the lighting).
- the correction parameters are suitable for modifying the durations or frequencies of activation of the pixels in order to compensate for a loss of clearness in the projected image, in particular close to the periphery of the light beam transmitted by the projecting optic (brightness or greyscale levels can be manipulated). The loss of clearness may, most often, be defined as an enlargement of the feature with appearance of at least one hazy edge.
- the identification or for all or some of the geometric defects comprises the following steps:
  a) turning on the light source;
  b) activating a series of pixels defined by the modulator in order to create a test pattern distributed over various pixel-containing zones of the module, the series of pixels having a continuous or discontinuous outline allowing a predefined shape parameter of the test pattern to be defined, and
  c) using the test pattern to define all or some of the correction parameters.
- step c) comprises at least one of the following substeps:
  i) comparing the shape parameter of the test pattern such as projected to the predefined shape parameter,
  ii) defining the correction parameters depending on the comparison results obtained in substep i)
- step c) comprises the following substeps:
  estimating a parameter representative of a haze in the test pattern such as projected,
  using at least one haze compensation in the correction parameters depending on whether or not a clearness threshold is exceeded by the estimated parameter.

According to one particularity, the beam transmitted from the modulator is segmented and contains at least one cut-off.

According to one particularity, the beam output from the optical module is a segmented low beam (the cut-off is a horizontal low-beam cut-off, for example formed by one or more upper edges of one or more segments of the beam) or a segmented high beam (the cut-off is a vertical cut-off, for example formed by one or more lateral edges of one or more segments of the beam).

According to one option, the segmented beam comprises at least one luminous line segment resulting, for example, from horizontally juxtaposed or partially superposed segments, each luminous segment being associated with all or some of a row of selectively activatable pixels, the activation of this row or section of row of pixels causing said luminous segment to light up.

According to one particularity, the light source is an electroluminescent element or a group of electroluminescent elements, for example one or more LEDs. Each of these elements may be connected to a control circuit belonging to the control unit.

Control of the pixels by the control unit creates adjustment flexibility and it will be understood that this control allows the projected image to be finely adjusted (which image may be projected to infinity from the projecting optic or from the projecting screen).

Another aim of the invention is to provide a luminous system for at least partially correcting undesirable deformations in a projected beam, said deformations being caused by certain manufacturing tolerances of an optical module of the type comprising a high-definition pixelated spatial modulator.

To this end, a luminous motor-vehicle system is provided that allows the method described above to be implemented, the system including:
  an optical module comprising:
    an imaging device, provided with a high-definition pixelated spatial modulator and a projecting optic,
  a light source for generating light intended for the modulator,
  and optionally a projection screen suitable for receiving a light beam transmitted by the projecting optic (screen not provided when the light beam is intended to be projected to infinity, i.e. to a large distance from the luminous system—a distance at least times larger, in particular 20 times larger, in particular 100 times larger than the dimensions of the luminous system); and
  a control unit of the modulator, designed and arranged to control the modulator and suitable for receiving first display commands, each of the first display commands being representative of an image to be projected,
  the control unit comprising adjusting means for converting each first display command into a second display command that takes into account the correction parameters.
  the correction parameters being predefined on the basis of an identification of geometric defects that are specific to the projecting optic, the control unit controlling the modulator depending on second display commands in order that the image actually projected by the imaging device corresponds better to the image to be projected than without the correction parameters taken into account.

According to one particularity, the high-definition pixelated spatial modulator comprises a digital micromirror device, the micromirrors of the digital micromirror device each being movable between:
  a first position in which the micromirror is arranged to reflect, in the direction of the projecting optic, light rays that come thereto from the light source or from a light-ray emitting unit that includes said light source.
  and a second position in which the micromirror is arranged to reflect light rays that come thereto from the light source or from a light-ray emitting unit that includes said light source, away from the projecting optic (out of the entrance pupil of the projecting optic).

According to one particularity, the projecting optic defines a large aperture angle, for, preferably, a numerical aperture higher than 0.5 and preferably higher than 0.7.

A luminous system according to the invention may include one or more of the following features:
  the high-definition pixelated spatial modulator is illuminated by the light source in an illuminated zone and defines a set plurality of pixels that are distributed in parallel rows of pixels, a first row at least of pixels optionally being able to be initially located outside of the illuminated zone because the spatial modulator is over-dimensioned.
  a marginal zone, which enables the over-dimensioning, corresponds to a peripheral zone having a frame format, defining a surplus of pixels at the top, at the bottom, to the left and to the right of the nominal area that suffices to create the desired image in case of absence of geometric defects (in the case of a digital micromirror device, one advantage associated with this over-dimensioning is also the possibility, if desired, to limit heating caused by lighting of the nonreflective border of the device).
  the active area in which the pixels are defined may have, in one or more marginal zones, a surplus of pixels with respect to a pixel format defined in each of the first display commands (by virtue of which it is possible to amend a centrality defect or barrel distortion, for which it is necessary to enlarge the image at the corners, or pincushion distortion, for which it is necessary to dilate the image toward the centre of its edges).
  the control unit is suitable for selectively controlling the high-definition pixelated spatial modulator in order to selectively activate one or more marginal zones located along edges or edge sections of the active area in which the pixels are defined, depending on the correction parameters (of course, the term "activate" may simply mean that one or more pixels/mirrors are passed to the activated state).
  the imaging device is suitable for projecting a segmented output light beam containing at least one cut-off.
  the pixels of the high-definition pixelated spatial modulator are distributed along a or parallel to a first axis and define rows parallel to the first axis, which rows are distributed in various levels along a second axis perpendicular to the first axis; in an operating configuration of the luminous system for a motor vehicle, the first axis typically corresponding to a horizontal axis and the second axis to a substantially vertical axis.
  the control unit has access to a memory storing the correction parameters and/or pieces of information representative of the second display commands.

According to another particularity, the luminous system comprises two optical modules, each including:
  an imaging device, provided with a high-definition pixelated spatial modulator and a projecting optic, and
  a light source for generating light intended for the modulator,
each light beam transmitted by one of the projecting optics being received on at least one projection screen.

Preferably, the control unit is suitable for controlling the modulator of each of the two optical modules while taking into account a first set of correction parameters that is associated with a first of the two optical modules and a second set of correction parameters that is associated with a second of the two optical modules. Typically, the correction parameters of the first set are predefined on the basis of an identification of geometric defects that are specific to the projecting optic in the first optical module, whereas the correction parameters of the second set are predefined on the basis of an identification of geometric defects that are specific to the projecting optic in the second optical module.

Provision may furthermore be made for a lighting and/or signalling lamp of a motor vehicle for projecting at least one light beam, the lamp comprising:

a housing;
a closing outer lens; and
a luminous system according to the invention.

Provision may moreover be made to form a luminous assembly, which has a first component and a second component that are formed by:

two lamps;
two headlamps; or
a lamp and a headlamp, the luminous assembly comprising a luminous system with two optical modules such as the aforementioned, the two optical modules being distributed one in the first component and the other in the second component.

Other features and advantages of the invention will become apparent from the following description of a plurality of the embodiments thereof, which are given by way of nonlimiting examples, with reference to the appended drawings, in which:

In the various figures, the same references have been used to reference elements that are identical or similar. The size of certain elements may have been increased in the drawings, in order to make them easier to understand.

Figure 1:
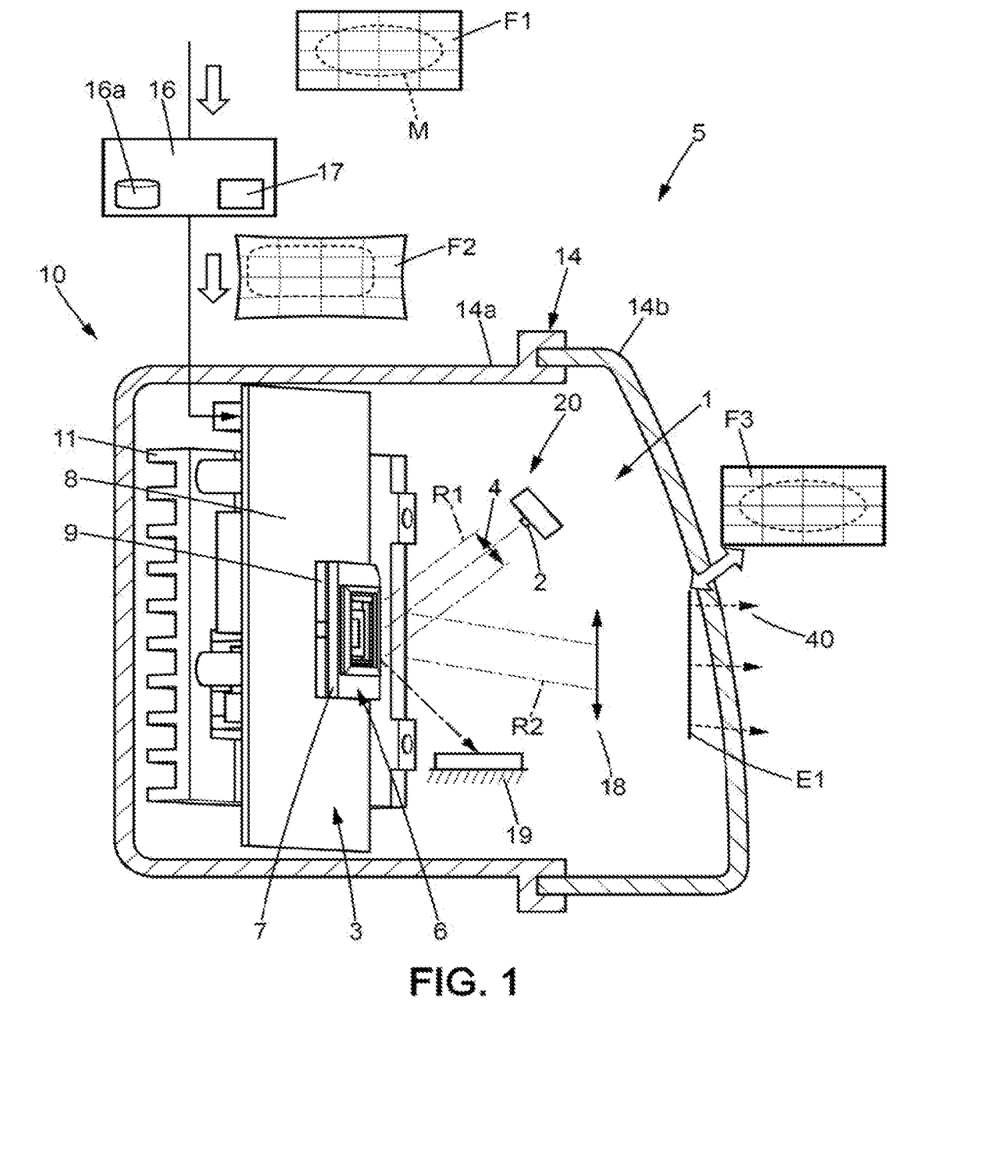
FIG. 1 schematically shows an example of a lighting motor-vehicle headlamp comprising an optical module and implementing an amendment of geometric defects.

FIG. 1 shows a first embodiment of an optical module 1 able to form or form part of a luminous motor-vehicle system 5, for example a front light or a rear light. The optical module 1 forms a light-emitting device configured to perform one or more functions, certain of these functions possibly being subject to photometric regulations.

The optical module 1 comprises, such as illustrated, a light-ray emitting unit 20, a digital micromirror device (DMD) 6, a control unit 16, for example taking the form of a controller 16, allowing micromirrors 12 of the digital micromirror device 6 to be controlled, and a projecting optic 18 (or forming optic). The control unit 16 may optionally be located remotely, for example in order to allow a plurality of optical modules 1 to be controlled. It will be understood that the luminous motor-vehicle system 5 may receive commands that are initiated centrally and that for example correspond to a command of a lighting and/or signalling function or another photometric function.

A preferred photometric function associated with the optical module 1 is a lighting and/or signalling function that is visible to the human eye. These photometric functions may be subject to one or more regulations establishing requirements in terms of colour, of intensity, of spatial distribution on a photometric test screen, or even of the ranges of visibility of the emitted light.

The optical module 1 is for example a lighting device forming a vehicle headlamp 10—or headlight. It is then configured to perform one or more photometric functions that are for example chosen from among a low-beam function, a high-beam function and a fog-light function.

Alternatively or in parallel, the optical module 1 is a signalling device intended to be arranged at the front or at the rear of the motor vehicle.

When it is intended to be arranged at the front, the photometric functions able to be performed using the optical module 1 (optionally in addition to those that it performs in its role as a lighting device) include a function for indicating changes in direction, a daytime-running-light (DRL) function, a front luminous signature function, a position-light function, and a side-marker function.

When it is intended to be arranged at the rear, these photometric functions include a function for indicating that the vehicle is reversing, a stop function, a fog-light function, a function for indicating changes in direction, a rear luminous signature function, a position-light function, and a side-marker function.

Provision is made for a light source 2 (here forming part of the unit 20) for generating the light rays, which form an emission R1 that is oriented toward the digital micromirror device 6. The light source 2 may consist of an electroluminescent element such as a light-emitting diode (or LED) or a matrix array of LEDs. In the case of a group of electroluminescent elements, the latter are preferably arranged together in the same zone and may be likened to a single light source. A laser diode, where appropriate, associated with a collimator system and optionally with a wavelength-converting device, may also allow the emission R1 to be formed.

In the case of a rear-light signalling function, the light source 2 may be red. In the case of a function for a front light, the light source 2 is preferably white.

Although the drawings show a digital micromirror device 6, it will be understood that the light rays emitted by the light source 2 may be directed, by means of a suitable optic, toward any type of high-definition pixelated spatial modulator 3 that allows the received emission R1 to be decomposed into pixels. In one variant embodiment, an LCD pixel matrix array, having in its optical plane active areas forming pixels, may be used. Specifically a device employing a transmissive LCD screen may be employed and, in this case, the optical path of the emission R1 may be replaced by an optical path internal to the LCD device, where appropriate without deviation. More generally, it will be understood that a first emission R1 may be received on an area that is very finely subdivided to define pixels with a high-definition, with typically more than 1280 by 720 pixels, and the configurations of which it is possible to modulate. It is preferably possible for each pixel to change its state, in a way known per se.

The light-ray emitting unit 20 may also be provided with a collimating lens 4 suitable for orienting the emission R1 onto the modulator 3. This unit 20 may also comprise "imaging" optics that deliver a convergent beam. In the example illustrated in FIG. 1, a collimating lens 4 or a set of collimating lenses is preferably used to receive the light of the light source 2, so that collimated light is received on an active, substantially rectangular, face of the digital micromirror device 6.

By way of nonlimiting example, a convergent lens may allow the collimation to be achieved. In this case, the light source 2 is advantageously placed in the vicinity of the object focal point of the convergent lens in order to ensure the light rays of the emission R1 propagating between the light-ray emitting unit 20 and the digital micromirror device 6 have a substantially beam-like form. Alternatively or in addition, the light-ray emitting unit 20 includes a reflecting mirror. In this case, the light source 2 is advantageously placed in the vicinity of the object focal point of this reflecting mirror.

The motor-vehicle headlamp 10 illustrated in FIG. 1 may be housed in a housing 14 or be bounded by the housing 14. The housing 14, such as illustrated, includes a body 14a forming a hollow interior space that receives at least part of the optical module 1. A cover 14b, which is at least partially transparent, is coupled to the body 14a in order to close the interior space. Such as illustrated, the cover 14b also forms a hollow that partially receives the optical module 1 and in particular all or some of the projecting optic 18.

The cover 14b is for example made from a plastic resin or another suitable plastic material. The lighting headlamp 10 may include a plurality of optical modules 1 that are then suitable for emitting neighbouring beams, the beams preferably overlapping partially. In particular, lateral ends of the neighbouring beams may be superposed. It is also possible, in another beam arrangement, to superpose the lower edge of one beam with the upper edge of another beam, for example in order to make it possible to make modifications to the beams digitally and obtain functions such as adaptive-driving-beam (ADB) and dynamic-bending-light (DBL) functions.

Here, the projecting optic 18 allows the reflected emission R2 to be formed after reflection from the digital micromirror device 6, thereby allowing an output beam 40 to be defined. More generally, the imaging device provided in the optical module 1 includes the high-definition pixelated spatial modulator 3 and the projecting optic 18.

Figure 3:
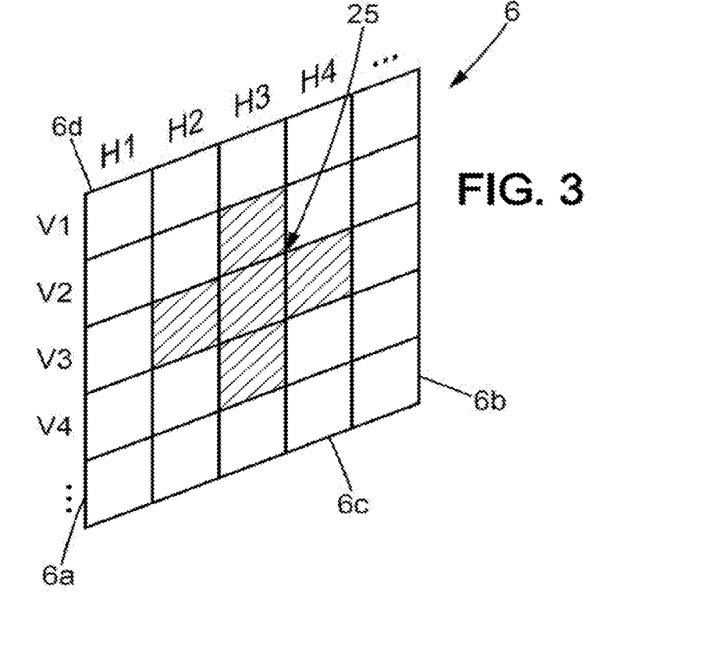
FIG. 3 illustrates, in a simplified way, the parameterization of the pixels of the modulator via coordinates along two axes of the area of the modulator that is activated to produce the output beam of the optical module, in order to allow the image actually projected to be adjusted.

The digital micromirror device 6 is for example rectangular, as illustrated in FIGS. 1 and 3. The digital micromirror device 6 thus mainly extends in a first extension direction, between lateral ends 6a, 6b of the digital micromirror device 6. In a second extension direction, which may correspond to a vertical dimension (height), there are also two opposite end edges 6c, 6d that are typically parallel to each other.

Figure 2:
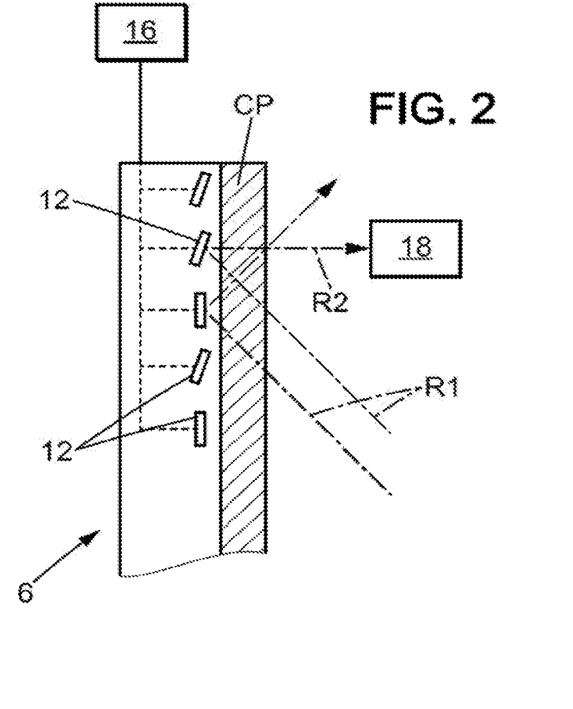
FIG. 2 schematically shows in cross section a detail of a digital micromirror device forming the high-definition pixelated spatial modulator, which device is used in the optical module of FIG. 1.

As may be seen in FIG. 2, the digital micromirror device 6 may optionally be covered with a layer CP for protecting the micromirrors 12, which layer is transparent. The pivot axis of each of the micromirrors 12 may for example allow a rotation of plus or minus 10° with respect to a nominal position without rotation.

With reference to FIG. 1, the digital micromirror device 6 is here essentially defined by an electronic chip 7 that is fastened to a printed circuit board 8 via a suitable socket 9. A cooling device, here a radiator 11, is fastened to the printed circuit board in order to cool the printed circuit board 8 and/or the chip 7 of the digital micromirror device 6. To cool the chip 7 of the digital micromirror device 6, the radiator 11 may have a protruding relief that passes through an aperture in the printed circuit board 8 in order to make contact with this chip 7, the socket 9 leaving free a passage for this protruding relief. A thermal grease, or any other means for promoting heat exchange known to those skilled in the art, may be interposed between the protruding relief and the digital micromirror device 6.

The control unit 16 is here connected to the digital micromirror device 6, or to another type of high-definition pixelated spatial modulator 3, for example through the printed circuit board 8. The control unit 16 may here command changes in the position of each of the micromirrors 12 of the digital micromirror device 6. In the case of an LCD pixel matrix array, the states of the pixels are also controllable in a similar way by the control unit 16. Such a control unit 16 may form part of the headlamp 10 and be integrated into the housing 14 or indeed be separate and located remotely away from the optical module 1.

The control unit 16 may be considered to form part of the luminous system 5, which combines a function for correcting display commands and light-projecting functions.

Figure 6A:
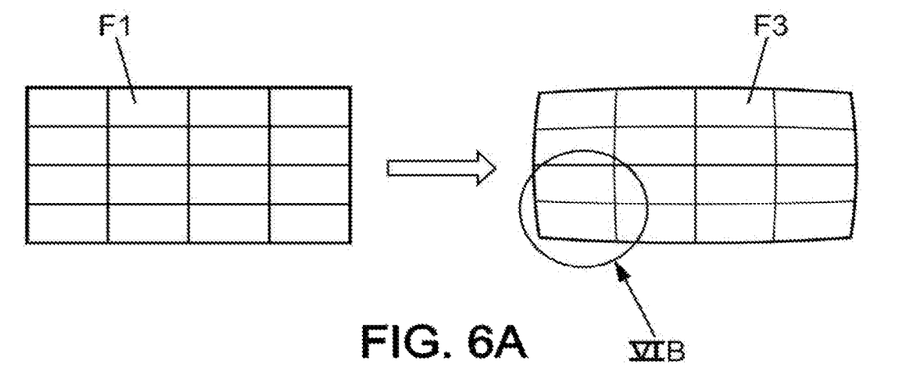
FIG. 6A illustrates an example of the deformation observed between the commanded image and the image that appears on the projection screen of the optical module, in the absence of correction.
Figure 6B:
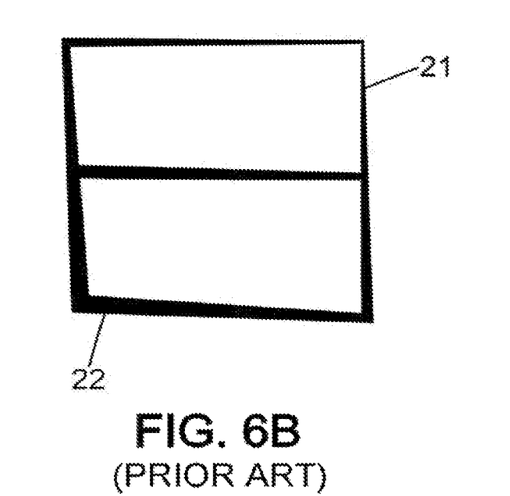
FIG. 6B illustrates, via a view of a detail of FIG. 6A, an example of the deformation observed with a haze effect that makes certain features of the projected image thicker.

FIG. 6A shows an example of the deformation observed in the prior art between the image F1 sent to the modulator 3 and the image F3 that appears on the projection screen E1 of the optical module, in the absence of correction. FIG. 6B furthermore illustrates the problem of haze with a particularly nonuniform illumination, creating thinner subzones 21 and thicker subzones 22.

As illustrated in FIG. 1, the control unit 16 is configured to at least partially correct the distortions created by the imaging optic, by generating a display command F2 that deforms the pattern of pixels that would normally be activated in the modulator 3 (pattern corresponding to the initial display command, or first display command F1, a representation of which is shown at the top of FIG. 1). The second display command F2 takes into account correction parameters in order to compensate for the distortions, which are generally caused by defects in the curvature of a lens or another optical element.

For example, a normally vertical line, such as appears in the number "1", could be curved in a concave manner to the left by such distortions when it is projected onto the projection screen E1. To correct this type of distortion, the relevant pixels in the modulator 3 that are activated to form this vertical line are changed from pixels that are in a straight line to pixels that are curved in a concave manner to the right (or in a concave manner to the left if other optical elements are present that invert the direction of curvature perceived by the driver). This change is integrated, in the form of a correction parameter, into the display command F2.

The degree of "curvature" or of compensation of the distortion of the imaging optic that is programmed into the pixels of the modulator 3 may be obtained using a test pattern M in an initial calibration phase (see FIG. 4) allowing the correction parameters to be identified and defined.

With regard to compensation for centrality defects (and possibly for deformation of the perimeter), the implementation of a compensation of this type of image distortion may require a distribution of pixels with a higher number of pixels than would be necessary if no correction of the image distortion were applied.

Specifically, while the high-definition pixelated spatial modulator 3 is illuminated by the light source in an illuminated zone bounded by a perimeter, this modulator 3 may define a set plurality of pixels 30 arranged in parallel rows of pixels, with a surplus of pixels that is such that it is possible to find at least one first row of pixels that is located beyond the perimeter of the illuminated zone. The modulator 3 is thus over-dimensioned, for example by a few tens of microns or one-hundred microns, so as to have this type of row of pixels on its margin. This first row of pixels, which is located far from a central point of symmetry of the modulator 3, will possibly not be used. However, because of the over-dimensioning, another far-off row of pixels, which is parallel and opposite to the first row, will possibly be used, if necessary, to compensate for geometric defects, and in particular a centrality defect, affecting the projection. Thus, the second display command F2 may differ from the first display command F1 in the selective activation of all or some of such another far-off row of pixels. This is applicable for compensation of a defect in the centrality of the illuminated zone on the modulator 3. The control unit 16 may also allow defects in the centrality of the projecting optic (and not of the upstream elements 4 and 2) to be compensated for. In this case, provision is made to illuminate the entire device 6, i.e. including the reserve pixels (which will possibly then allow distortion to be corrected).

With reference to FIG. 1, the control unit 16 may have a memory 16a and adjusting means 17 for modifying the operating state of the pixels defined by the modulator 3. In the case of a digital micromirror device 6, the adjusting means 17 allow the movement of the micromirrors 12 to be controlled. As schematically illustrated in FIG. 2, only some of the micromirrors that have a first position actually deviate the emission R1 that comes from the light source 2 or from a light-ray emitting unit 20 so as to transmit the light energy to the reflected emission R2 that is directed toward the projecting optic 18. The other micromirrors 12 are in a deactivated second position (position that prevents light radiation from being collected by the projecting optic 18) or possibly are located outside of the illuminated zone of the modulator 3.

Here, in the digital micromirror device 6, each of the micromirrors 12 is movable between:
 a first position, in which the micromirror 12 reflects the incident light rays of the emission R1 in the direction of the projecting optic 18,
 and a second position, in which the micromirror 12 transmits, by reflection, the incident light rays of the emission R1 away from the projecting optic 18, for example towards a device 19 for absorbing radiation that has a light-absorbing surface.

With reference to FIG. 3, the control unit 16 may define a display command corresponding to a pattern or image 25 on the device 6. Here it is a question of a cross, but it could be a question of an annular shape, of an alphanumeric character or of any other geometric element that is easy to represent in the form of coordinates (horizontal coordinates H1, H2, H3, H4, etc. and vertical coordinates V1, V2, V3, V4, etc. as summarily illustrated in FIG. 3) or of vectors. Depending on the correction parameters taken into account by the control unit 16, the routine applied by the adjusting means 17 may consist in modifying position, shape and/or adjusting brightness in peripheral zones of the pattern 25 in order to compensate for distortions and aberrations identified and calibrated during an identification of the geometric defects.

A table of vectors may typically be determined in such a step, with a view to selectively modifying the state of the pixels of the modulator 3. Such a table of vectors may list: micromirrors 12 that are to be selectively deactivated, i.e. micromirrors that have been determined as corresponding to zones of "excessive" reflection of light in an initial calibration step; and, in addition, micromirrors 12 to be selectively activated, which may also be specified in this table, in correspondence with the determination of zones "lacking" reflection of light in the initial calibration step.

For the case of use of a digital micromirror device 6, the adjusting means 17 thus take into account the table of vectors so that the pixels activated are adjusted. Typically, the memory 16a of the control unit 16 stores data representative of the positional shifts induced by the geometric defects specific to the projecting optic 18. These data may already incorporate compensations to be applied to correct for such shifts or a programme may be included in the adjusting means 17 in order to deduce from these data the compensation to be applied. Such positional shift data form all or some of the correction parameters.

These data may be accompanied by factors to be applied to the greyscale levels, or even by coefficients of linear combinations of the values of the greyscale levels of neighbouring pixels giving the greyscale level to be given to the new pixel (moved pixel). Typically, provision may be made for the movements to be calculated for each pixel individually, and the factors to be applied to the greyscale levels, by interpolation of the values found on the few points of the test pattern M.

For a centrality defect, FIG. 1 schematically illustrates the inverse deformation that it is necessary to apply in the second display command F2 in order to simultaneously compensate for the deformation of the type shown in FIG. 6A, illustrated in the absence of correction.

Figure 4:
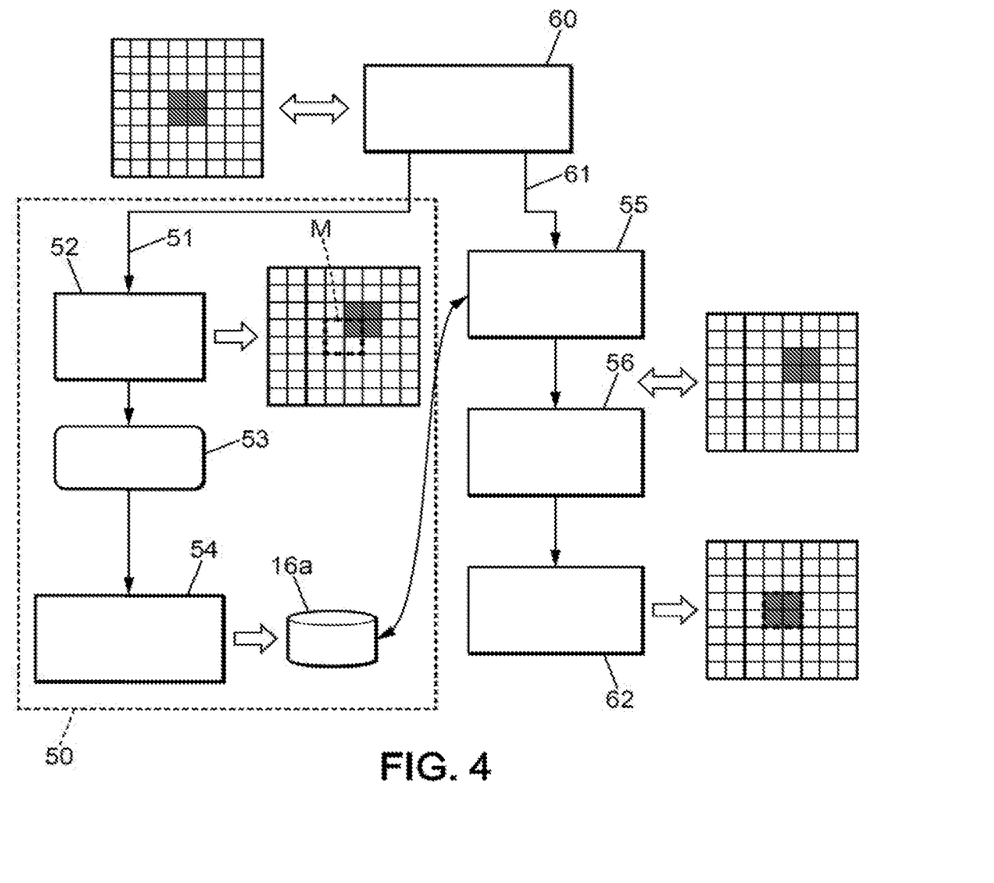
FIG. 4 is a diagram of the steps implemented in a method for amending geometric defects according to the invention.

With reference to FIG. 4, the method for amending geometric defects in the light beam projected by the optical module 1 may comprise a calibration phase 50, which is preferably implemented before the first actual use of the optical module 1 in a motor vehicle. In this nonlimiting example, the calibration phase 50 is initiated following a step 60 of starting up the optical module 1, in which step a first display command is transmitted to the modulator 3b. This first command here corresponds to a default command that takes into account neither variations in the specific structure of the projecting optic 18 nor variations in the way in which the projecting optic 18 is mounted, and that is therefore only appropriate in the absence of geometric defects.

The calibration phase 50 begins with the step 51 in which the first command is received by the modulator 3. There follows a step 52 in which a configuration of use of the pixels is generated. FIG. 4 illustrates a case in which the first display command essentially results in a shift related to a centrality defect. A step 53 in which defects are identified may then begin, this step preferably using a test pattern M that can be observed on the projection screen E1.

The term "test pattern" is here to be understood in the sense that is conventional in optics. Taking into account the context of an illumination decomposed into pixels 30, a test pattern thus generally corresponds to a set of lines/pattern elements of different orientations and widths. The test pattern M here serves to in particular study the clearness limits, deformations and distortion effects that are observed when the emission R2 is projected by the projecting optic 18.

During the calibration phase 50, the collection and analysis of pieces of information on positional shifts and other aberrations is preferably automated, for example using sensors and an image-processing and defect-identifying programme, by comparing the expected position of noteworthy points of the test pattern M and the position actually obtained. The test pattern M is for example generated by activating a predefined series of pixels that has at least one continuous or discontinuous outline allowing a shape parameter of the test pattern M to be defined.

Optionally, it is possible to generate a test pattern M that extends over the entirety of the digital micromirror device 6, in order to identify defects as exhaustively as possible. In such a test pattern M, transitions between dark or black pixels and light pixels are preferably numerous and distributed over all the zones of pixels, thereby allowing a pattern 25 that is obviously more extensive and typically more complex than that shown by way of illustration in FIG. 3 to be generated.

In the defect-identifying step 53 pieces of shift information are gathered and a set series of pieces of shift information, relating to differences in position and in shape affecting the test pattern M such as projected onto the projection screen E1, is generated. Next, the correction parameters may be obtained in a step 54 in which the correction parameters to be applied to allow the light beam to be transmitted from the modulator 3 to be modified are calculated depending on the set series of pieces of shift information.

The memory 16a may then be used to store pieces of information that are representative of these correction parameters. For the subsequent solicitations of the optical module 1, these correction parameters will be systematically taken into account, so as to modify the activation or deactivation of certain pixels of the modulator 3.

Typically, in steps 53 and 54, one or more shape parameters of the test pattern M such as projected may be compared to one or more predefined shape parameters of the test pattern. The results of this comparison allow at least some of the correction parameters to be defined. A deformation of the outline of the image, for example a local modification of curvature, orientation or thickness (haze) may also be compensated for. Provision may thus be made to estimate a parameter representative of a haze in the test pattern M such as projected. Depending for example on whether or not a clearness threshold is exceeded by the estimated parameter, an associated compensation may be integrated into the correction parameters. This type of compensation may be applied zone by zone. In the case where the number of "activated" pixels is decreased with a view to limiting a haze effect in a certain zone, an "activated/inactivated" pixel ratio in this zone may be recalculated in order to compensate for the flux decrease associated with the decrease in the number of pixels used. It is possible to correct the thickness of certain lines, this proving to be advantageous, for example for line drawings or text.

The correction parameters may also allow, where appropriate, durations or frequencies of activation of the pixels 30 of the modulator 3 to be modified in order to compensate for a decrease in the brightness of the projected image F3, in particular near the periphery of the light beam transmitted by the projecting optic 18.

After these steps, the calibration phase 50 may end. Alternatively, the relevance of the correction parameters may optionally be tested by reiterating steps 52 and 53, this optionally allowing the correction parameters to be refined. Furthermore, the calibration phase may be divided into a plurality of sub-phases, in particular when the optical module 1 has a plurality of operating modes that have an impact on the shape, division or uniformity of the desired output beam 40.

Next, the optical module 1 may be employed in a vehicle, in particular a motor vehicle having a control unit 16 that controls the modulator 3 so as to systematically convert the first display command into a second display command that takes into account the correction parameters determined in the calibration phase 50.

Thus, in the nonlimiting case of FIG. 4, it may be seen that following steps 60 and 61, in which steps the optical module 1 is started up and the modulator 3 receives the first command (i.e. the command not taking into account geometric defects) respectively, the control unit 16 gathers, in step 55, in the memory 16a, pieces of information representative of the correction parameters. This allows the modulator 3 to be controlled in an adjusted manner, in a step 56 in which the second display-command function is executed.

The step 62, in which a configuration of use of the pixels is generated, and which is functionally similar to step 52, then leads to the use of the modulator 3 being individualized to compensate for the geometric defects specifically identified in the calibration phase 50.

Figure 5A:
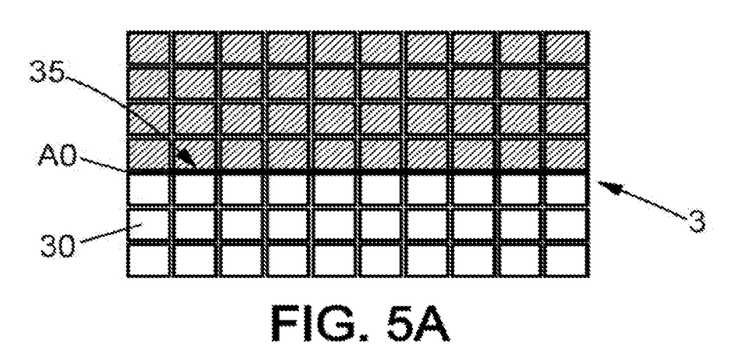
FIGS. 5A and 5B schematically show a luminous distribution that would be correct in the absence of significant geometric defects in the optic, and the luminous distribution that actually has to be parameterized, on account of the geometric defects, to obtain the desired photometric rendering, respectively.

With reference to FIGS. 5A and 6A, a visible distortion effect that may affect the projection of a horizontal boundary or cut-off 35 may be seen. The projected image F3 may contain a brightness defect, for example in the corners of the projection screen E1 (shift in the edges, shown in FIG. 6A). When the optical module 1 comprises such geometric defects, here for a segmented beam, the method may be implemented so that the use of the pixels 30 is reorganized, with relocation of the boundaries between the pixels activated to form the emission R2 and deactivated pixels. Here, in this nonlimiting example, the pixels 30 are sufficiently numerous to be able to correspond to a resolution of less than 1°, and preferably of about 0.1° or less. In addition, the upper zone of the modulator 3 may comprise a surplus of pixels 30 with respect to the initially specified pixel requirements, in order to make provision for the margin required to apply the corrective effect.

Figure 5B:
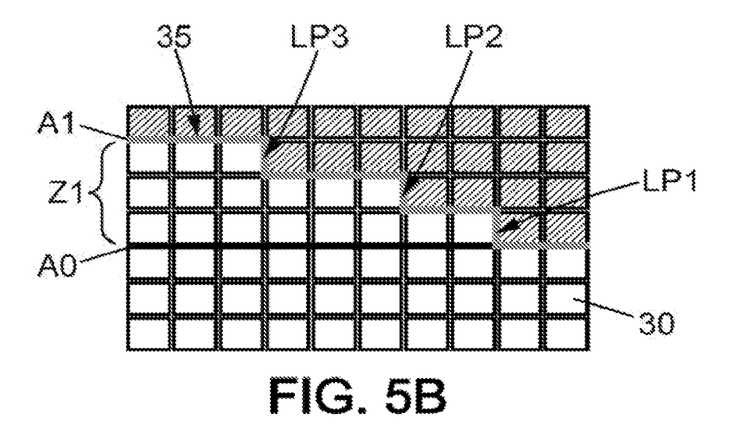

The process illustrated in FIG. 4 or a similar process is then applied to take into account the correction parameters, in order to compensate for the distortion effect shown on the right of FIG. 6A. In practice, here for a corner zone of the digital micromirror device 6, the distribution of turned-on pixels provided to define the horizontal boundary at a height level A0, as shown in FIG. 5A, is modified. Via the effect of conversion of the first display command into a second display command, it is then possible to obtain, for the same corner zone, a very different distribution of pixels 30, which distribution is illustrated in FIG. 5B. Here, the separation at the height level A0 is replaced by a stepped profile, the height level of the pixels 30 that are activated gradually increasing to a maximum height level A1. The added row sections LP1, LP2 and LP3 allow the localized brightness defect in the corner zones to be compensated for. With reference to FIG. 5B, the marginal zone Z1 that was added results from the definition of the correction parameters obtained in the calibration phase 50. This example for the marginal zone Z1 is given in the upper left-hand corner of the case shown in FIG. 6A.

Of course, other zones of the digital micromirror device 6 may be processed by subtracting pixels 30, in order to avoid excess brightness. Specifically, the control unit 16 associated with the optical module 1 may both remove and add pixels 30, for example pixels forming rows or sections of rows LP1, LP2, LP3 of pixels or columns or sections of columns of pixels.

After the correction parameters have been implemented and taken into account, in particular during each use of the optical module 1 in a motor vehicle of the optical module 1, the image F3 projected onto the screen E1 conforms better to the desired image of the first display command F1. In certain cases in which the optical module 1 is used for lighting purposes (in particular in the case of high beams or low beams), the fact that some pixels 30 are neutralized or attenuated makes it possible to ensure that deformations or distortion effects do not cause road users to experience glare, or only glare that is within regulatory limits.

The memory 16a may optionally allow a default configuration state of the micromirrors 12 to be stored and this state may be modified to take into account the correction parameters. Such a change then corresponds to a modification of the display command. Of course, the way in which the distribution of activated and deactivated pixels is adjusted, by modifying the display command, may be carried out according to many variants.

The method for correcting/amending geometric defects may be employed to correct both centrality defects, one or more deformations caused by distortion and where appropriate certain more localized aberrations.

One of the advantages of the optical module 1 is to allow a light beam that may be uniform to be projected, so that the projecting optic 18 of this optical module 1 is perceived to be perfectly assembled, without however in fact requiring recourse to be made to a tedious or excessively expensive production and assembly mode.

It will be obvious to those skilled in the art that the present invention makes possible embodiments taking many other specific forms that do not however depart from the claimed field of application of the invention.

Thus, while the optical module 1 has been illustrated for a case in which the projecting screen E1 is defined internally with respect to the transparent wall forming the outer lens of the transparent cover 14b, it will be understood that a portion of the transparent cover 14b or another element forming part of the external housing 14 may define the projection screen. The projecting optic 18 may for example be focused on a film formed on the external side of the outer lens rather than on a distinct screen.

Furthermore, additional functions may be implemented depending on the requirements. For example, in the context of a large-angle imaging optic (numerical aperture of 0.5 or 0.6 or 0.7, by way of nonlimiting example), it will be understood that an indication or marking may be added within the output light beam 40. Specifically, the use of a high-definition pixelated spatial modulator 3 and the correction of aberrations allows characters (letters, numbers or similar) to be formed with a sufficient resolution to allow messages or pictograms that are for example representative of the activation of a functionality or of an operating context of the vehicle to be displayed for the attention of people outside.

The invention claimed is:

1. A method for amending geometric defects in a light beam projected by an optical module of a motor vehicle, the optical module including an imaging device, provided with a high-definition pixelated spatial modulator and a projecting optic, and a light source for generating light intended for the modulator, the method comprising:
   receiving a first display command to display an image to be projected, intended for the modulator, the first display command including image data of the image to be projected; and
   converting the first display command into a second display command that takes into account correction parameters,
   wherein the correction parameters are predefined on the basis of an identification of geometric defects that are specific to the projecting optic, by virtue of which the modulator is controlled so that the image actually projected using the imaging device corresponds better to the image to be projected than without said correction parameters taken into account, and
   wherein the second display command differs from the first display command in selective activation of all or some of a row of pixels, said row being defined in a marginal zone by the modulator.

2. The method according to claim 1, wherein the correction parameters are suitable for modifying activation statuses of the pixels defined by the modulator, in order to compensate for at least one among the following defects:
   a lateral shift of an outline of the light beam transmitted by the projecting optic; and
   a deformation of the outline of the light beam transmitted by the projecting optic.

3. The method according to claim 2, wherein the correction parameters are suitable for modifying durations or frequencies of activation of the pixels of the modulator in order to compensate for a loss of clearness in the projected image close to a periphery of the light beam transmitted by the projecting optic.

4. The method according to claim 1, wherein the correction parameters are suitable for modifying durations or frequencies of activation of the pixels of the modulator in order to compensate for a loss of clearness in the projected image close to a periphery of the light beam transmitted by the projecting optic.

5. The method according to claim 1, wherein the correction parameters and/or the second display command are stored in a memory accessible to a control unit, the control unit being suitable for activating the second display command.

6. A method according to claim 1, wherein the correction parameters are suitable for modifying activation statuses of the pixels defined by the modulator, in order to compensate for at least one among the following defects:
   a lateral shift of the outline of the light beam transmitted by the projecting optic; and
   a deformation of the outline of the light beam transmitted by the projecting optic.

7. The method according to claim 1, wherein the correction parameters are suitable for modifying the durations or frequencies of activation of the pixels of the modulator in order to compensate for a loss of clearness in the projected image close to the periphery of the light beam transmitted by the projecting optic.

8. The method according to claim 1, wherein the correction parameters and/or the second display command are stored in a memory accessible to a control unit, the control unit being suitable for activating the second display command.

9. A luminous system for a motor vehicle, allowing the method according to claim 1 to be implemented, the system including:
   an optical module comprising:
   an imaging device, provided with a high-definition pixelated spatial modulator and a projecting optic, and
   a light source for generating light intended for the modulator, and
   a control unit designed and arranged to control the modulator and suitable for receiving first display commands, each of the first display commands being representative of an image to be projected, the control unit comprising adjusting means for converting each first display command into a second display command that takes into account correction parameters, the correction parameters being predefined on the basis of an identification of geometric defects that are specific to each projecting optic, the control unit controlling the modulator depending on second display commands in order that the image actually projected by the imaging device corresponds better to the image to be projected than without the correction parameters taken into account.

10. A luminous system for a motor vehicle, allowing a method to be implemented for amending geometric defects in a light beam projected by an optical module of a motor vehicle, the optical module including an imaging device, provided with a high-definition pixelated spatial modulator and a projecting optic, and a light source for generating light intended for the modulator, the method including: receiving a first display command to display an image to be projected, intended for the modulator, the first display command including image data of the image to be projected; and converting the first display command into a second display command that takes into account correction parameters, the converting of the first display command into the second display command includes adjusting pixels of the image to be projected, wherein the correction parameters are predefined on the basis of an identification of geometric defects that are specific to the projecting optic, by virtue of which the modulator is controlled so that the image actually projected using the imaging device corresponds better to the image to be projected than without said correction parameters taken into account, the system including:

an optical module comprising:
  an imaging device, provided with a high-definition pixelated spatial modulator and a projecting optic, and
  a light source for generating light intended for the modulator, and
  a control unit designed and arranged to control the modulator and suitable for receiving first display commands, each of the first display commands being representative of an image to be projected,
  the control unit comprising adjusting means for converting each first display command into a second display command that takes into account correction parameters,
  the correction parameters being predefined on the basis of an identification of geometric defects that are specific to each projecting optic, the control unit controlling the modulator depending on second display commands in order that the image actually projected by the imaging device corresponds better to the image to be projected than without the correction parameters taken into account.

11. The system according to claim 10, wherein the high-definition pixelated spatial modulator comprises a digital micromirror device, micromirrors of the digital micromirror device each being movable between:
  a first position in which the micromirror is arranged to reflect light rays that come thereto from the light source or from a light-ray emitting unit that includes said light source, in the direction of the projecting optic,
  and a second position in which the micromirror is arranged to reflect the light rays that come thereto from the light source or from a light-ray emitting unit that includes said light source, away from the projecting optic.

12. The system according to claim 11, wherein the control unit has access to a memory storing the correction parameters and/or information representative of the second display commands.

13. The system according to claim 12, wherein the imaging device is suitable for projecting a segmented output light beam containing at least one cut-off.

14. The system according to claim 12, comprising two optical modules each including:
  an imaging device, provided with a high-definition pixelated spatial modulator and a projecting optic, and
  a light source for generating light intended for the modulator,
  each light beam transmitted by one of the projecting optics being received on at least one projecting screen,
  the control unit being suitable for controlling the modulator of each of the two optical modules while taking into account a first set of correction parameters that is associated with a first of the two optical modules and a second set of correction parameters that is associated with a second of the two optical modules,
  the correction parameters of the first set being predefined on the basis of an identification of geometric defects that are specific to the projecting optic in the first optical module, whereas the correction parameters of the second set are predefined on the basis of an identification of geometric defects that are specific to the projecting optic in the second optical module.

15. The system according to claim 11, wherein the imaging device is suitable for projecting a segmented output light beam containing at least one cut-off.

16. The system according to claim 11, comprising two optical modules each including:
  an imaging device, provided with a high-definition pixelated spatial modulator and a projecting optic, and
  a light source for generating light intended for the modulator,
  each light beam transmitted by one of the projecting optics being received on at least one projecting screen,
  the control unit being suitable for controlling the modulator of each of the two optical modules while taking into account a first set of correction parameters that is associated with a first of the two optical modules and a second set of correction parameters that is associated with a second of the two optical modules,
  the correction parameters of the first set being predefined on the basis of an identification of geometric defects that are specific to the projecting optic in the first optical module, whereas the correction parameters of the second set are predefined on the basis of an identification of geometric defects that are specific to the projecting optic in the second optical module.

17. A luminous assembly having a first component and a second component that are formed by:
  two lamps;
  two headlamps; or
  a lamp and a headlamp,
  the luminous assembly comprising a system according to claim 16, said two optical modules being distributed one in the first component and the other in the second component.

18. A lighting and/or signalling lamp of a motor vehicle for projecting at least one light beam, the lamp comprising:
  a housing;
  a closing outer lens; and
  a luminous system according to claim 11.

19. A lighting and/or signalling lamp of a motor vehicle for projecting at least one light beam, the lamp comprising:
   a housing;
   a closing outer lens; and
   a luminous system according to claim 10.

\* \* \* \* \*